United States Patent [19]
Shogan

[11] 4,214,394
[45] Jul. 29, 1980

[54] FISHING ALARM DEVICE

[76] Inventor: Regis P. Shogan, 1739 Mountain View Dr., Monroeville, Pa. 15146

[21] Appl. No.: 907,505

[22] Filed: May 19, 1978

[51] Int. Cl.² .............................................. A01K 97/12
[52] U.S. Cl. ...................................................... 43/17
[58] Field of Search ...................... 43/16, 17, 17.5, 24; 200/61.19; 340/548, 573

[56] References Cited

U.S. PATENT DOCUMENTS

| | | | |
|---|---|---|---|
| 2,580,956 | 1/1952 | Reddick | 43/17 |
| 2,741,055 | 4/1956 | Weber | 43/17 |
| 2,986,835 | 6/1961 | Ordinetz et al. | 43/17 |
| 3,103,759 | 9/1963 | Kluge et al. | 43/17 |
| 3,250,036 | 5/1966 | Wenger | 43/17 |
| 3,600,836 | 8/1971 | Miyamae | 43/17 |
| 3,702,513 | 11/1972 | Watts | 43/17 |
| 3,959,910 | 6/1976 | Montgomery | 43/17 |

FOREIGN PATENT DOCUMENTS 1060115  11/1953  France ........................................ 43/24

Primary Examiner—Nicholas P. Godici
Assistant Examiner—K. Bradford Adolphson
Attorney, Agent, or Firm—Edward L. Levine

[57] ABSTRACT

A device for indicating the pull of a fish on a line including an adjustably biased activator, such as an electrical contact which can be separated by a non-conductive portion of a fishing line. A pull on the line removes the line from the contact which closes due to the bias and completes an electrical circuit. The circuit includes an audible or visual alarm, or both. The device can be small and lightweight, and fitted directly to a fishing rod, a rod support or other convenient support structure.

4 Claims, 3 Drawing Figures

FISHING ALARM DEVICE

BACKGROUND OF THE INVENTION

1. Field of the Invention

This invention relates to fishing apparatus and alarm apparatus, and more particularly provides an alarm which alerts a fisherman to a pull on a fishing line.

2. Description of Prior Art

Commonly called "still fishing" involves the use of a baited hook and a line which is cast and left in place while the fisherman waits for a fish to bite. Accordingly, still fishing typically involves long waiting periods during which the fisherman must keep vigilant surveillance of the line since the fish might drop the bait if the hook is not properly set within a few moments. Still fishing is complicated during periods of poor visibility, or when multiple rods are being used, since the observation of movement of the line is impeded.

A common procedure is to tighten the line between the reel and bait and to hang a twig or fishing bobber on the line below the rod which will move or bob when a bite occurs. This practice, while allowing movement of the line to be detected more easily, does not completely solve the problems of poor visibility, night conditions or separated rods.

Various other solutions have been proposed. For example, ice fishermen typically use a mechanical flag on a "tip up" which pops up upon occurrence of a bite. Such visual signals can, however, go undetected for a period of time by an ice fisherman in a remote shelter. Another solution, described in the "Beginner's Guide to Home Coarse Tackle Making," L. Burrell, Pelham Books, 1972, proposes winding the fishing line about the toggle of a mercury switch which, upon movement of the line, closes an electrical circuit including an audible alarm. This solution, however, appears to be subject to sticking and line damage. Another proposed solution uses a mercury switch which closes an electrical alarm circuit upon tightening of the line. This system may stop signalling if the bite is intermittent or if the fish runs toward the rod. Additionally proposed is a device which closes an electrical circuit upon movement of the fishing rod in a ground-mounted rod-holder which is relatively bulky.

Therefore, while the proposed solutions are operative in many circumstances, they are not without deficiencies. Most particularly, none of the proposed solutions are easily adjustable with respect to the amount of pull to cause actuation. Further, none of the proposed solutions are attachable directly to the fishing rod.

Accordingly, it is desireable to provide a fishing alarm device which alleviates these deficiencies. Such device preferably should be lightweight, small, inexpensive and adaptable to a rod or other convenient structure. It advantageously should be adjustable as to the tension or pull needed for actuation.

SUMMARY OF THE INVENTION

This invention provides a fishing alarm device which is lightweight, small and adaptable directly to a fishing rod which is actuated by a slight pull on a non-conductive fish line by movement of the line itself. It further is adjustable to a desired actuation pull or tension. The line is supported between two surfaces which, when contacted together by removal of the line in response to a bite, complete an electrical circuit including a power source and an alarm. The tension required to support the line between the two supports is adjustable, preferably by a simple spring. The alarm can be audible, visual or both, and the power source, alarm and electrical wiring are preferably enclosed in a lightweight, non-conductive, semi-water-proof plastic housing. Apparatus for mounting the alarm device to a fishing rod is also utilized.

BRIEF DESCRIPTION OF THE DRAWINGS

The advantages, nature and additional features of the invention will become more apparent from the following description, taken in connection with the accompanying drawings in which.

DESCRIPTION OF THE PREFERRED EMBODIMENTS

Figure 1:
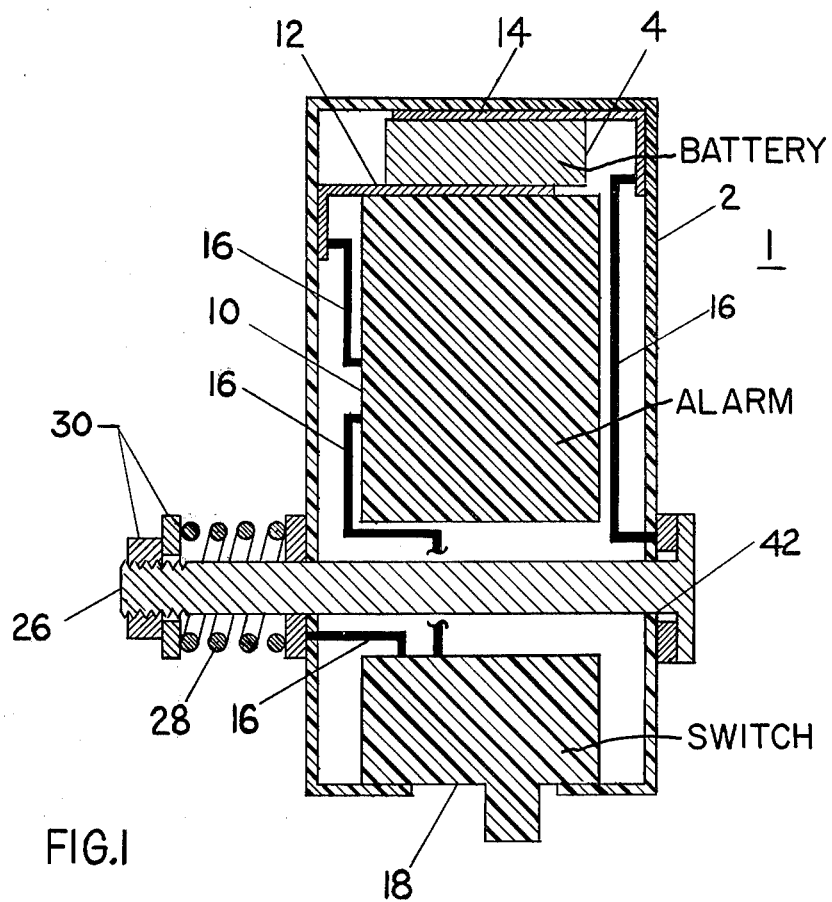
FIG. 1 is a plan view, in section, of an alarm device in accordance with the invention, shown in the alarm position.
Figure 2:
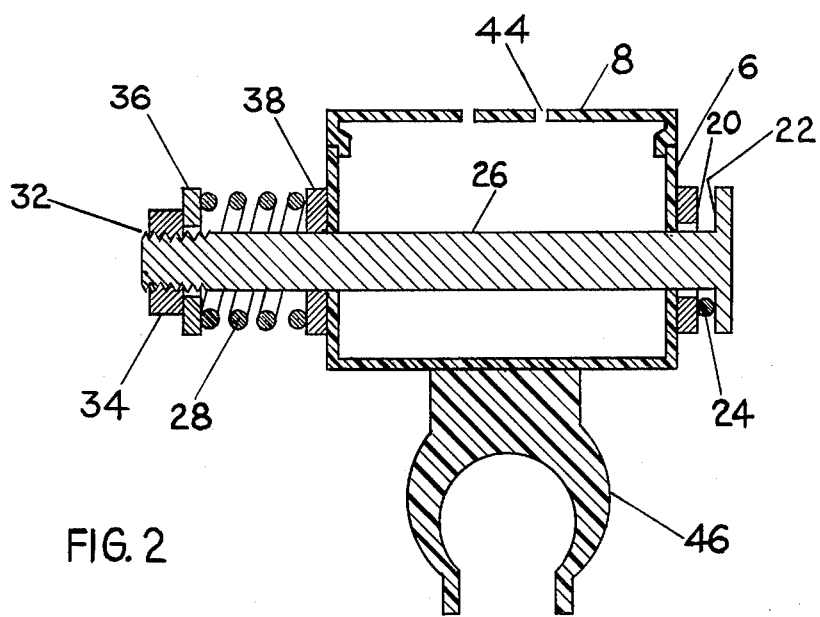
FIG. 2 is an elevation view, in section, of selected components of the device of FIG. 1, shown positioned for support of a fish line.

Referring now to FIGS. 1 and 2 there is shown an exemplary fishing alarm device 1 in accordance with the invention. It includes an enclosure or housing 2, preferably of a non-electrically conductive material such as plastic. For ease of assembly and replacement of a power source such as a battery 4, the housing is preferably comprised of a bottom portion 6 and a snap-on top 8. The housing preferably is sealed at least to the extent that it is water-tight to resist damage from splashing. The housing can be of plastic approximately 1/16 inch thick with outer dimensions of approximately 1¾ inches in length, ⅜ inch width and ¾ inch height.

Within the housing 2 are an alarm 10, the battery 4, battery contact mounts 12, 14, and electrical wiring 16 connecting the components to form an electrical circuit such as shown in FIG. 1. The housing 2 can additionally enclose a portion of an electrical switch 18.

The device 1 further includes two surfaces 20, 22 which, when separated by a fishing line 24 (FIG. 2), open the circuit and, upon removal of the line 24 (FIG. 1) contact to complete the circuit when the switch 18 is in the energized or "on" position. The surfaces 20, 22 preferably comprise the metallic washer 20 affixed to the housing 2 and the surface 22 affixed to a bar 26 which is moveable with respect to the washer 20 and biased toward contact with the washer 20. The surface 22 and bar 26 can, as shown, comprise an integral bolt where the surface 22 is the bolt head and the bar 26 is the bolt shank. The electrical circuit preferably includes the bar 26, although other configurations, readily apparent to those skilled in the art, are equally possible. The surfaces 20, 22 preferably have a smooth finish to allow ease of removal of the line 24 in response to a bite. A roughened surface could result in the line merely being pulled through the contacts instead of slipping out from between them. Further, a smooth finish alleviates concerns over damage to the line.

The biasing force is preferably adjustable to accommodate lines 24 of different diameter and to support the line with a force adjusted to the strength of the bite expected by the fisherman. An adjustable bias is easily accomplished by elastic means such as a spring 28 which acts upon the housing 2 and a restraint 30. The restraint 30 is moveable along the bar 26 to compress or relax the spring 28 and is held in the desired adjusted position by means such as threads 32. It can merely comprise a properly sized nut 34 or, as shown, a nut 34 in conjunction with a washer 36. The spring 28 accordingly acts at one end upon the washer 36 and at the other end upon the housing directly or, to distribute the load, upon another washer 38 preferably affixed to the housing 2.

Insulated wiring 16 or other conductive means is used to create an electrical circuit which is completed upon contact of the surfaces 20 and 22 including the battery 4, battery clip 14, the surface 20, the surface 22 and the bar 26, the restraint 30, the spring 28 and washer 38, the on-off switch 18, if a switch is utilized, the alarm 10 and the battery clip 12. Many other configurations, such as one incorporating rubbing contacts between the switch and bar, are equally possible. It will be noted that the bar 26 passes through, without contacting, the surface 20. The bar is accordingly supported near the surface 20 by the opening 42 in the housing 2. The opening 42 can also be supplied with a non-conductive seal (not shown), if desired, which allows the bar to translate. Accordingly, the circuit is only complete or closed upon movement of the bar 26 which allows contact of the surfaces 20, 22.

The switch is preferably incorporated in the device 1, although it need not be. Where not used a connection can be made directly from the bar 26 to the alarm 10. It will be evident that the method, order and components used to electrically join the various components of the circuit can be varied as well known in the art, the key area being the adjustably biased contact of surfaces 20 and 22 which actuates the alarm upon removal of the line 24.

An exemplary audible device 1, compatible with the dimensions of a plastic housing 2 as described above, includes components identified in Table I. The Table identifies a visual alarm which can be used as an alternative to the audible alarm within the described housing. The device 1 is, of course, also compatible with both audible and visual alarms.

TABLE I

| Component | Specifications |
|---|---|
| Audible alarm (buzzer) | Citizen America Corp. Model SMB-01; solid state electronic micro-buzzer (electro-acoustic transducer); 70 dB at 20 cm; 1.5 volts; approx. 16mm × 22.5mm × 14.5mm |
| Visual alarm (light) | Radio Shack Model 272-1139; 1.5 volts; approx. 0.5 inch × 0.125 inch dia. |
| Power source (battery) | Miniature disc type; Mallory Model MS 76; 1.5 volts; approx. 3/16 inch × 7/16 inch dia. |
| Biasing component (spring) | Coil type compression spring; approx. 1 lb./in. spring constant; spring wire 0.01 inch thick coiled to 12 turns/in. at 3/16 inch O.D.; approx. length ¾ inch; conductive material; |
| Bar, nuts, washers | Brass, copper, conductive stainless steel, or plastic with conductive coating; bar approx. ⅛ inch dia.; |
| Switch | Slide switch Radio Shack Model 275-327 |

The audible alarm listed in Table I can be heard clearly at a distance of twenty feet, but is not overly loud or annoying to others in the fishing area. It further has a low current drain, on the order of only 17 mA.

The light indicated is sufficient to indicate which of several alarms might be sounding in the dark of night and, as with all of the components, is lightweight, small and has a low power consumption.

The battery, because of the low use factor and power drainage, can be expected to power the device for a time period essentially equal to its shelf life of approximately one year.

Tests conducted over a range of fishing conditions have shown that an adjustable biasing force of between 0.5 to 3 ounces is preferred acting between the contacts 20, 22 to properly support a line while maintaining sensitivity to light bites. The exact force utilized will depend upon such factors as wind, wave and other environmental conditions and the type of fish sought. An exemplary device was tested with a bar 26 having thirty-two threads per inch and resulted in a force of approximately one-half ounce per turn, which requires about five turns to traverse the preferred force range. It will be apparent that a heavier spring constant allows the device to be adapted to, for example, trolling rather than still fishing. In trolling a large constant tension is encountered at all times.

It will be further apparent that modifications and additions can be made to the device without departing from the scope of the teaching. For example, apertures 44 can be placed in the portion of the housing 2 adjacent the audible alarm to allow a more direct release of the sound waves. Additionally various types of mountings can be utilized to affix the device to a fishing rod or other structure such as the snap-on clip 46. Threaded or otherwise adjustable mounts can also be used which are adaptable to the exact size of the component to which the device is mounted.

Figure 3:
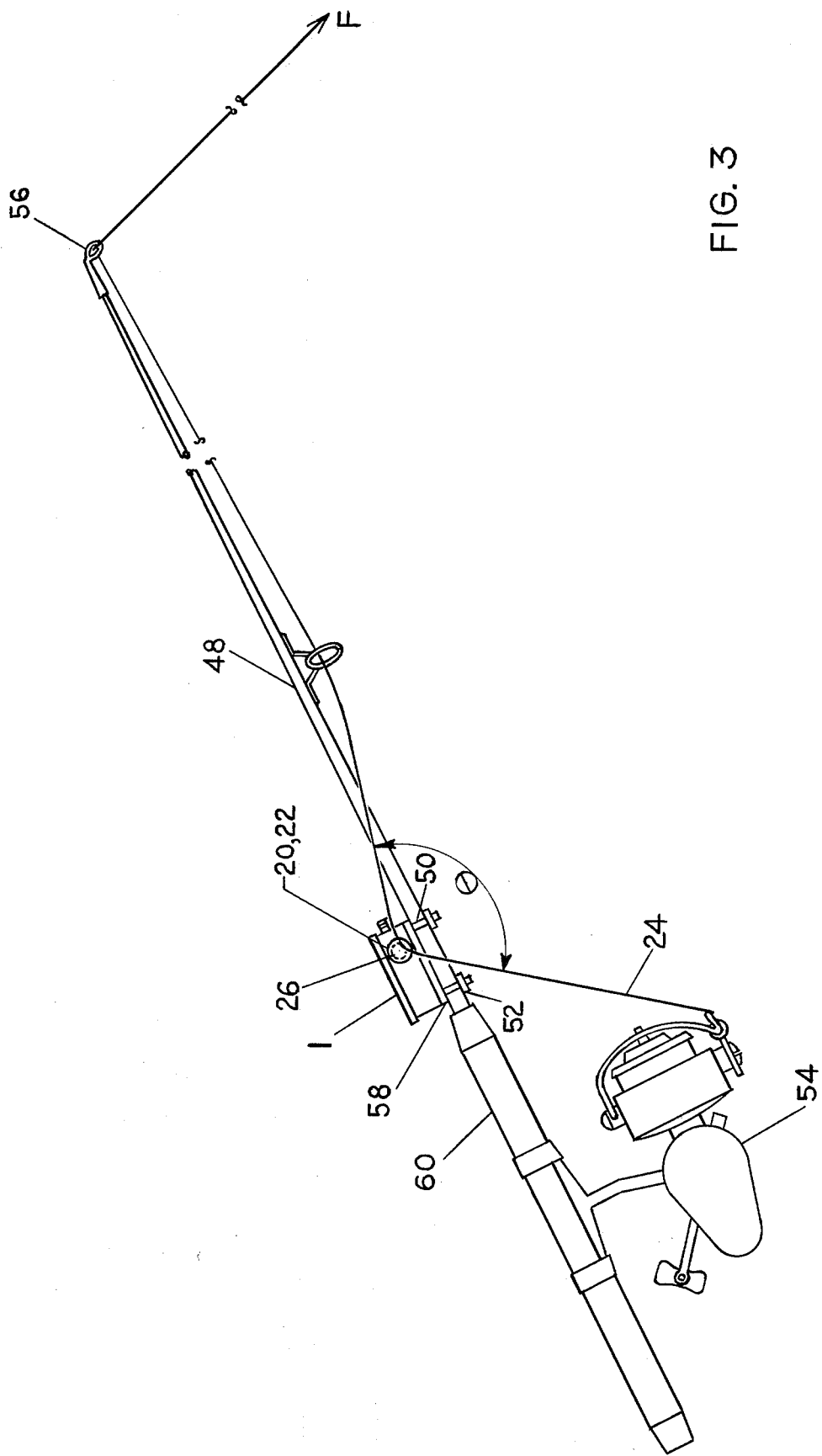
FIG. 3 is an elevational schematic of the inventive device positioned on a fishing rod.

A simplified illustration of the device 1 as mounted to a fishing rod 48 is shown in FIG. 3. The device is here mounted to the rod 48 by four (two shown) plastic bolts 50 and nuts 52. A flexible plate, such as one of rubber, can also extend between the bolts 50, held by the nuts 52 so as to provide stronger support of the device to the rod.

The line 24 is supported between the contacts 20, 22 and below the bar 26. The device can be mounted at any position along the length of the rod although it is preferably mounted as close to the grip as possible to lessen the angle $\theta$ formed by the line between the reel 54 and the device 1, and the device and the portion of the line toward the tip 56 of the fishing rod 48. As the angle $\theta$ decreases, the force F caused by the fish bite required to free the line 24 from between the contacts 20, 22 is lessened, and there is less possibility of the line 24 sliding through the contacts 20, 22 without being totally removed. Accordingly, the mounting means can include a spacer 58 to allow the device to be raised a predetermined distance from the fishing rod. Further, the device is preferably mounted atop the rod, as shown in FIG. 3, or rotated 180° to a position below the rod. If mounted at another angle such as, for example, a 90° rotation from that shown, the possibility of the line sticking between the contacts is increased, as can be the force F required to free the line.

Other modifications and variations are possible. For example, a mechanical equivalent is envisaged having a hand-wound spring as a power source communicating with an audible alarm actuated by movement of the bar 26 upon removal of a fish line, in a manner similar to the workings of a music box. Although such arrangement would require rewinding for each use, would be practically limited to an audible alarm and is deemed to be less reliable than an electrically driven device, it would be workable. Additional variations are also possible within the scope of my invention.

I claim:

1. An alarm device adapted to be mounted on a fishing rod having an electrically insulating fishing line, comprising:

an electrically driven alarm;

an electrical power source; and adjustably biased structure for supporting said fishing line and for completing an electrical circuit through said alarm and power source upon removal of said fishing line from a supported position, said structure including a fixed contact surface having an opening therethrough and a bar movable in spaced relation through said opening, said bar having a movable contact surface contactable with said fixed contact surface upon movement of said bar within said opening, said fishing line being removably supportable between said fixed contact surface and said movable contact surface, said structure biasing said movable contact surface toward contact with said fixed contact surface, said fixed contact surface and said moveable contact surface being electrically connected to said electrically driven alarm and said electrical power source such that said electrical circuit is completed when said moveable contact surface contacts said fixed contact surface upon removal of said fishing line.

2. The device of claim 1 further comprising an on-off switch in said circuit, whereby said circuit is completable only when said switch is in the on position.

3. Apparatus of claim 1 wherein said alarm is at least one of an audible and a visual indicator.

4. Apparatus of claim 1 further comprising a non-conductive housing substantially enclosing said alarm, power source and a portion of said bar.

* * * * *